Feb. 26, 1924.
C. H. PEER
TIRE RIM TOOL
Filed March 28, 1923
1,484,737
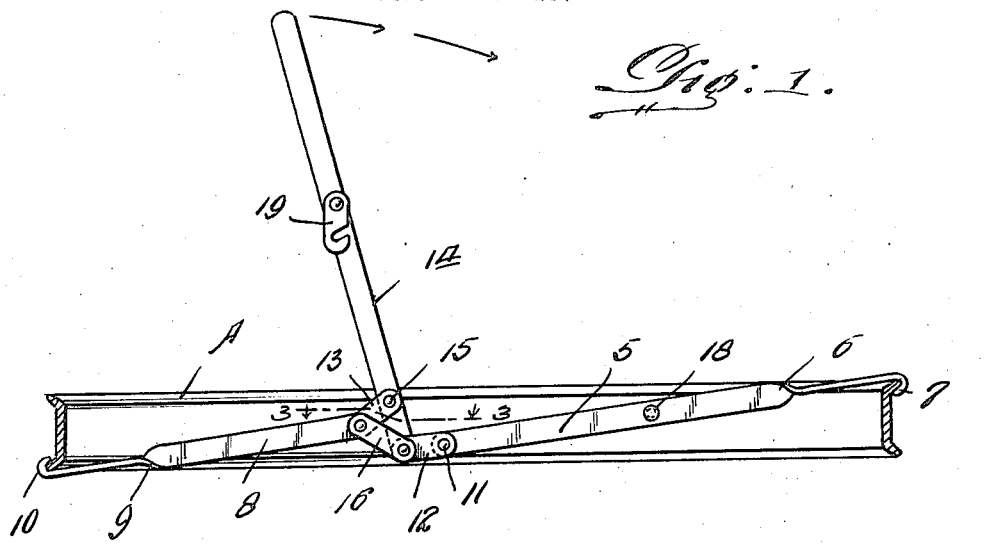
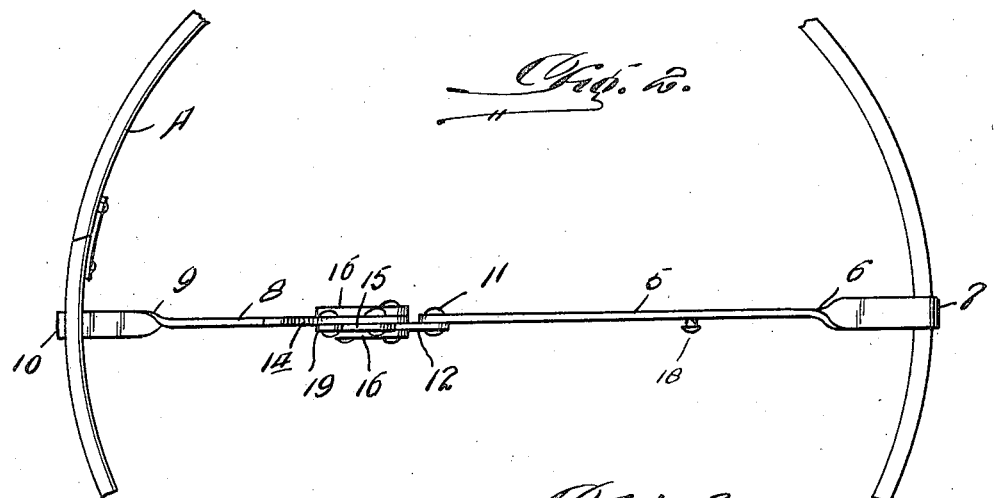
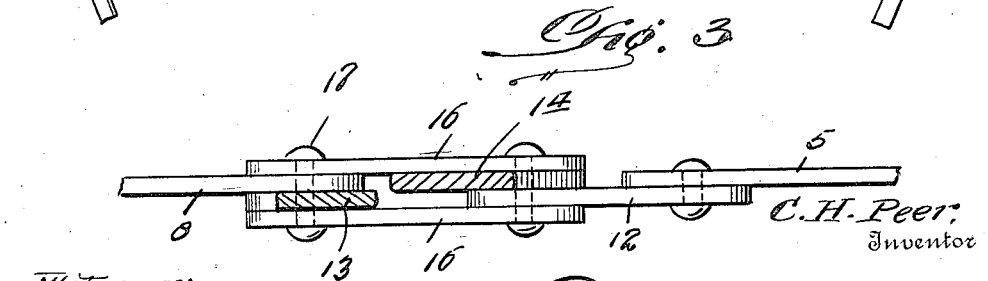

Patented Feb. 26, 1924.

1,484,737

UNITED STATES PATENT OFFICE.

CHARLES H. PEER, OF DENVILLE, NEW JERSEY.

TIRE-RIM TOOL.

Application filed March 28, 1923. Serial No. 628,165.

*To all whom it may concern:*

Be it known that I, CHARLES H. PEER, a citizen of the United States, residing at Denville, in the county of Morris and State of New Jersey, have invented certain new and useful Improvements in Tire-Rim Tools, of which the following is a specification.

In carrying out the present invention, it is my purpose to provide a tire rim tool, that will substantially improve upon the construction of the tire rim tool shown and described in my co-pending application, Serial #613,121, filed January 17th, 1923, and one that will at the same time embrace the desired features of simplicity, durability and efficiency, attributed to the tool set forth in this co-pending application.

The nature and advantages of the invention will be better understood when the following detailed description is read in connection with the accompanying drawings, the invention residing in the construction, combination, and arrangement of parts as claimed.

In the drawing forming part of this application, like numerals of reference indicate similar parts in the several views, and wherein:

Figure 1—is an elevational view of one side of a tire rim tool, constructed in accordance with my invention, the same being shown as applied to a rim, and in such a position as to effectively contract the rim, this rim being shown in cross section.

Figure 2—is a top plan view thereof, the rim being shown fragmentarily, and

Figure 3—is an enlarged detail cross section upon the line 3—3 of Figure 2.

Referring to the drawing in detail, 5 designates a relatively elongated arm 5 of flatlike material, one end of the same being twisted at 6, and formed with a hook 7, for engaging the top side flange of the usual split rim A. 8 designates another arm of a shorter length than the arm 5, also of flatlike material, and being bent adjacent one end as at 9, and hooked at its end as at 10, for engaging under the opposite flange upon the opposite side of said split rim A. Pivoted to the arm 5 at 11, and in substantial alinement therewith when the tool is positioned upon the rim as per Figure 1, for contracting the same is a short link 12, while also pivotally secured to the adjacent end of the arm 8 and being inclined upwardly therefrom when the tool is in the said position, is a link 13. 14 designates a hand lever, to the lower end of which is pivoted the opposite end of the said link 12, the opposite end of the link 13 being also pivoted to this hand lever at 15, and at a point slightly above the pivotal connection to the said link 12. Loosely, pivotally connected between the pivotal ends of the link 12, and hand lever 14 are connecting links 16, one upon each side of the said hand lever, the opposite ends of these links being pivotally joined to the arm 8 and link 13, through the medium of the pivotal connection 17 between said link and arm.

Upon the arm 5 at a point substantially intermediate the ends thereof is a laterally projecting pin 18, and pivoted to the hand lever 14 is a hook 19, that is adapted for engagement with said pin when the lever has been swung forwardly in the direction of the arrows, Figure 1, for contracting the rim A, and for maintaining the same in its contracted relation.

In the use of this tool it will be noted that when the handle 14 is moved from the position shown in Figure 1 in the direction of the arrows for contracting the rim to remove a tire therefrom, in the first portion of the movement the handle will rock on the pivot connection with the link 12 until the edge of the handle engages the end of the link 5, whereafter it will rock on the pivotal connection between the link 12 and the link 5 on the edge of said link until the edge of the lever 14 contacts with the edge of the link 5. In this position the catch 19 may be moved over the lug 18 for locking the parts in rim contracting relation. In the movement of this lever as above described the links 13 and 16 will hold the pivotal connection with the link 8 spaced from the lever 14 and also from its pivot on the link 12 as well as the pivotal connection 11 with the link 5 in a position transversely of the direction of pull between said lengths, so that the levers 5 and 8 are held in an offset relation with each other for providing a relative twisting action between the opposite sides of the rim for moving one end of the rim laterally relative to the other end of the rim in contracted relation. The movement of the lever 14 in its contact with the edge of the link 5 moves the link 12 on its pivot 11 and serves to further separate and offset the arms 5 and 8 with respect to each other in the final movement of the lever to the position for securing the catch 19 over the stud 18.

In view of the above description when considered in connection with the accompanying drawing, it will at once be apparent that I have provided a tire rim tool that is a substantial improvement over the tool shown and described in the above set forth pending application, and one that will at the same time embody all of the salient features attributed to the tool in this pending application.

It is of course to be understood that although I have herein shown and described my tool as embodying certain structural elements, these elements may be modified as occasion demands, without departing from the spirit and scope of the invention as claimed.

Having thus described my invention, what I claim as new, and desire to secure by Letters Patent, is:—

A tire rim tool including a hand lever, a link pivoted at one side of and at one end of said hand lever, an arm pivotally connected to the end of a link at one end, at the same side as the hand lever, and formed with a rim engaging hook at the other end for engaging the flange at one side of the rim, a link member connected to the hand lever in spaced relation with the end pivotally connected with said link, a pair of links connected at one end to the handle at the pivot with the first mentioned link and at the other end to the end of the link member beyond the lever, a co-operating arm having one end pivotally connected with the pair of links and link member at their point of connection, said pivot being spaced from the hand lever, and said co-operating arm having a rim engaging hook at its other end for engaging the opposite flange at the opposite side of the rim, whereby in the movement of the hand lever to contract a rim, it will move about its pivot on the link through the first portion of its movement and in the remaining portion of its movement the edge of the lever will engage the end of the first mentioned arm and rock on said arm until the edges of the lever and arm contact, the first mentioned link permitting the last mentioned movement of the lever and the pair of links and link members separating the pivots of the respective arms laterally with respect to the line of pull of the arms, and means for securing the lever in edge contact with the edge of the arms.

In testimony whereof I affix my signature.

CHARLES H. PEER.